United States Patent
Aonuma et al.

(10) Patent No.: US 7,270,368 B2
(45) Date of Patent: Sep. 18, 2007

(54) SHROUD SUPPORTING STRUCTURE AND SHROUD MOUNTING METHOD

(75) Inventors: Takahiro Aonuma, Fuchu-cho (JP); Tatsuo Nozaki, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 116 days.

(21) Appl. No.: 11/010,297

(22) Filed: Dec. 14, 2004

(65) Prior Publication Data

US 2005/0134094 A1 Jun. 23, 2005

(30) Foreign Application Priority Data

Dec. 22, 2003 (JP) ............... 2003-424857
Sep. 30, 2004 (JP) ............... 2004-285780

(51) Int. Cl.
*B60N 2/00* (2006.01)
(52) U.S. Cl. ............... 296/203.02; 296/187.09; 296/193.09
(58) Field of Classification Search ........... 296/203.02, 296/193.09, 193.1, 193.01, 193.04, 187.09, 296/187.1; 180/68.6
See application file for complete search history.

(56) References Cited

U.S. PATENT DOCUMENTS

| | | | | |
|---|---|---|---|---|
| 5,271,473 | A * | 12/1993 | Ikeda et al. ............... | 180/68.4 |
| 6,648,399 | B2 * | 11/2003 | Ozawa et al. ............ | 296/193.09 |
| 6,672,652 | B2 * | 1/2004 | Takeuchi et al. ......... | 296/193.09 |
| 6,729,424 | B2 * | 5/2004 | Joutaki et al. ............ | 180/68.4 |
| 6,893,081 | B2 * | 5/2005 | Sasano et al. ........... | 296/203.02 |
| 6,923,495 | B2 * | 8/2005 | Kishikawa et al. ...... | 296/193.09 |
| 2001/0010275 | A1 * | 8/2001 | Sasano et al. ........... | 180/68.1 |
| 2002/0043820 | A1 * | 4/2002 | Brogly et al. ........... | 296/203.02 |
| 2002/0190542 | A1 * | 12/2002 | Takeuchi et al. ........ | 296/194 |
| 2003/0160477 | A1 * | 8/2003 | Sasano et al. ........... | 296/203.02 |
| 2005/0088015 | A1 * | 4/2005 | Kishikawa et al. ...... | 296/193.09 |
| 2005/0275250 | A1 * | 12/2005 | Wada ...................... | 296/203.02 |

FOREIGN PATENT DOCUMENTS

| | | |
|---|---|---|
| EP | 1 213 207 A1 | 6/2002 |
| FR | 2 833 559 | 6/2003 |
| JP | 2000-257522 | 9/2000 |

* cited by examiner

*Primary Examiner*—D. Glenn Dayoan
*Assistant Examiner*—Greg Blankenship
(74) *Attorney, Agent, or Firm*—Nixon Peabody LLP; Donald R. Studebaker

(57) ABSTRACT

A shroud supporting structure is provided which includes a shroud 5 which has a rectangular shape and whose opening is oriented in the front and rear directions of an automobile, in which: to front-end parts 3 of a pair of front side-frames 2 which is disposed on both right and left sides, first height portions A, B in both side parts 5c, 5d of the shroud 5 which correspond to the front-end parts 3 are attached; and protrusion portions 5f, 5g which protrude sideward in second height portions C, D that are located above the first height portions A, B in both side parts 5c, 5d are attached to brackets 6, 7 which protrude upward from the front-end parts 3 of the front side-frames 2.

14 Claims, 8 Drawing Sheets

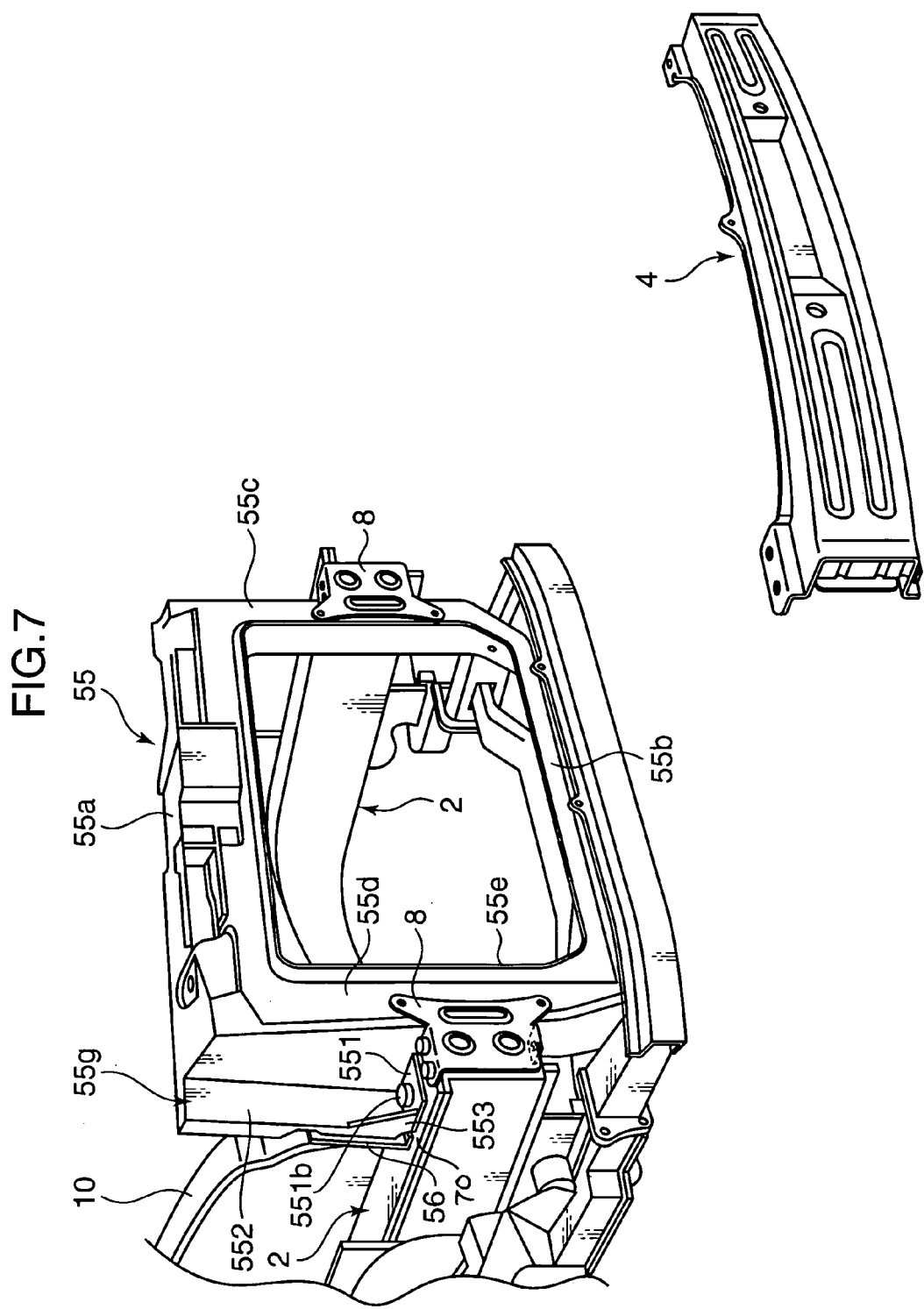

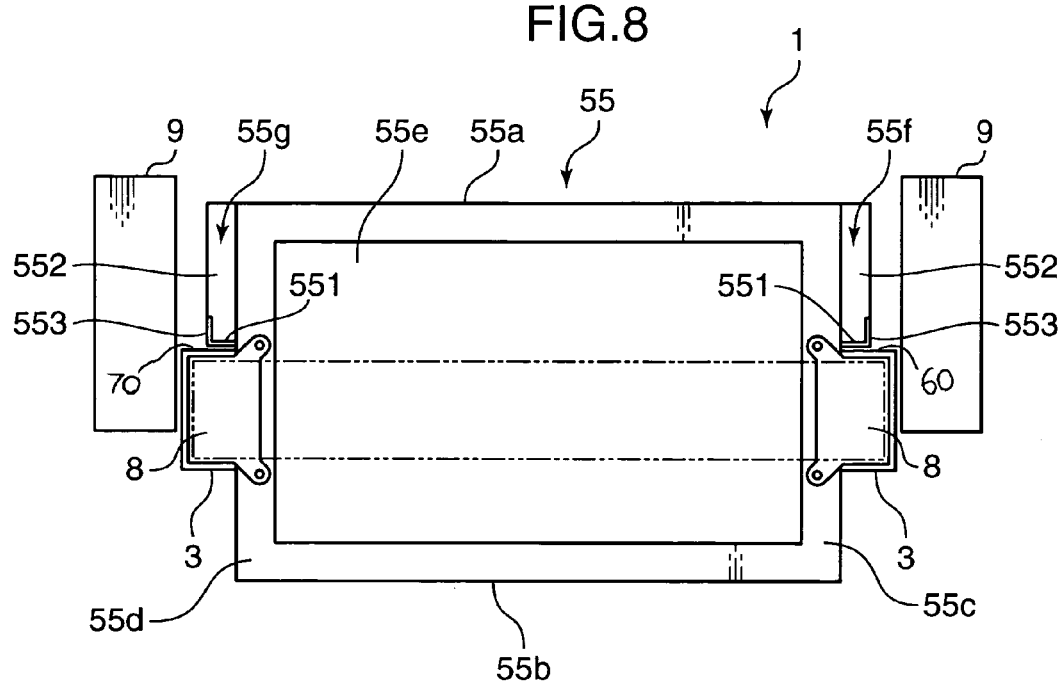
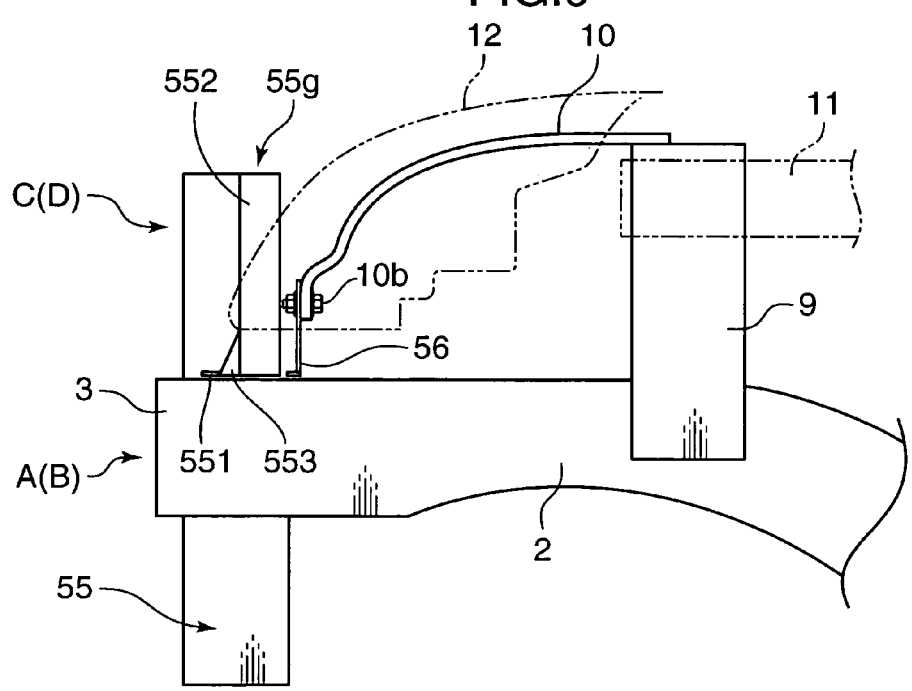

SHROUD SUPPORTING STRUCTURE AND SHROUD MOUNTING METHOD

BACKGROUND OF THE INVENTION

1. Field of the Invention

This invention relates to a structure for supporting a shroud to which a radiator or the like is attached, in the front part of the body of an automobile, and a method for mounting the shroud therein.

2. Description of the Related Art

As such a structure for supporting a shroud, there is known the one shown in FIG. 10 (e.g., refer to Japanese Patent Laid-Open No. 12-257522 specification or the like). In this structure, attachment portions 100a on both sides of the upper part of a shroud 100 are attached to apron reinforcements 101, and attachment portions 100b on both sides of the lower part of the shroud 100 are attached to front frames 102. In other words, in two positions of each of its upper and lower parts, the shroud 100 is supported to a vehicle body. In the shroud 100, a radiator is attached to its middle rectangular portion 100c, and a headlamp is attached to each of its right and left portions 100d.

In recent years, there has been a great demand for making a headlamp longer in the front and rear directions. If a headlamp becomes longer, it gets in the way of an apron reinforcement, thereby making it difficult to extend the apron reinforcement's front end up to the position in which a shroud is provided. This has compelled those skilled in the art to adopt a structure in which an apron reinforcement is positioned more backward. If you want to support both sides of a shroud to such apron reinforcements, as had conventionally been implemented, you need to bend backward both sides of the upper part of the shroud and extend up to the apron reinforcements. However, if both sides of the shroud's upper part are extended rearward, both sides become longer and narrower in the front and rear directions of the vehicle. Such a structure extremely lowers the rigidity by which the shroud's upper part is supported. This is substantially equivalent to the fact that the shroud is supported to the vehicle body, only at its lower part where it is supported by the front ends of front frames. As a result, there is a disadvantage in that the shroud may fall in the front and rear directions of the vehicle body.

BRIEF SUMMARY OF INVENTION

In order to resolve the disadvantage in such a prior art, it is an object of the present invention to provide a shroud supporting structure and a shroud mounting method which are capable of preventing a shroud from falling in the front and rear directions, even in a vehicle body where the front ends of apron reinforcements are located behind the shroud.

In order to fulfill this object, a shroud supporting structure according to the present invention comprises:

a shroud which has a substantially rectangular shape and whose opening is oriented in the front and rear directions of an automobile;

a pair of front side-frames which is disposed on both right and left sides;

a pair of headlamps which is disposed in both side parts of the shroud and above the front side-frames;

a pair of right and left apron reinforcements which is disposed above the front side-frames and whose front ends each extends up to the rear end of the headlamp, and in which a first portion having a first height in both side parts of the shroud which corresponds to the front-end part of each of the pair of front side-frames is attached to this front end, and a second portion having a second height which corresponds substantially to the headlamp above each first portion in both side parts is attached to the body of the automobile, wherein:

the rear end of the headlamp is located behind the shroud;

a protrusion portion which protrudes sideward is formed in each of the second portion in both side parts of the shroud; and a bracket which protrudes upward up to the second portion is formed on the front-end part of the front side-frame and the protrusion portion is attached to said bracket.

According to the present invention, the shroud is supported, not only at the first portions of both side parts by the front side-frames, but also at the second portions of both side parts by the brackets which are formed in the front side-frames. Therefore, each side part of the shroud can be supported in positions which are different in the height directions. In other words, the place where the shroud is supported to the front side-frame becomes longer in the up-and-down directions. This helps heighten the rigidity by which the shroud is supported, thus effectively preventing the shroud from falling. Hence, the shroud can be effectively prevented from falling, even though it is supported only by the front side-frames. Thus, there is no need to support the shroud by any apron reinforcements. Therefore, a vehicle body could be properly dealt with, even if it has a configuration where the rear end of a headlamp is disposed behind a shroud, in other words, where the front end of an apron reinforcement is located behind the shroud. In addition, the number of the places increases at which a front side-frame which is one of the most rigid vehicle-body members is connected to a shroud. This helps heighten the rigidity by which the shroud is supported.

These and other objects, features and advantages of the present invention will become more apparent upon reading of the following detailed description along with the accompanied drawings.

BRIEF DESCRIPTION OF THE DRAWINGS

FIG. 7 is a perspective view of a shroud supporting structure according to a second embodiment of the present invention.

FIG. 8 is a front view of the shroud supporting structure according to the second embodiment, corresponding to FIG. 1.

FIG. 9 is a right-side view of the shroud supporting structure according to the second embodiment, corresponding to FIG. 3.

DETAILED DESCRIPTION OF INVENTION

Hereinafter, embodiments of the present invention will be described with reference to the drawings.

First Embodiment

A first embodiment of the present invention will be specifically described below.

Figure 1:
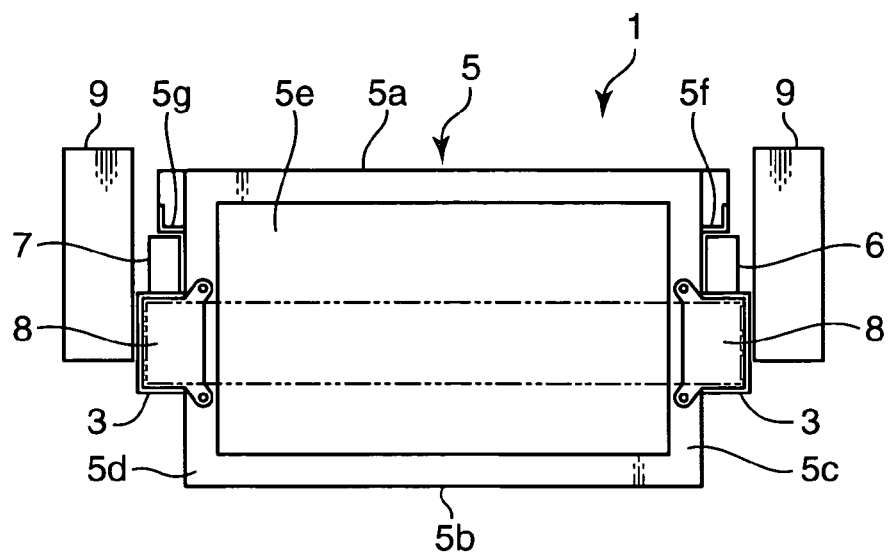
FIG. 1 is a front view of a shroud supporting structure according to a first embodiment of the present invention.
Figure 2:
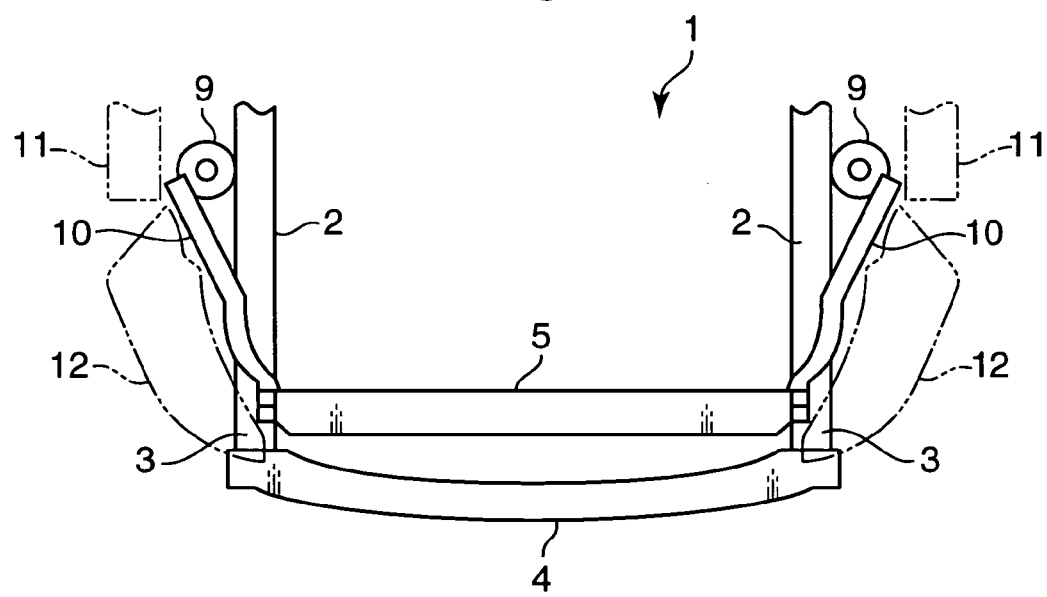
FIG. 2 is a plan view of this supporting structure.
Figure 3:
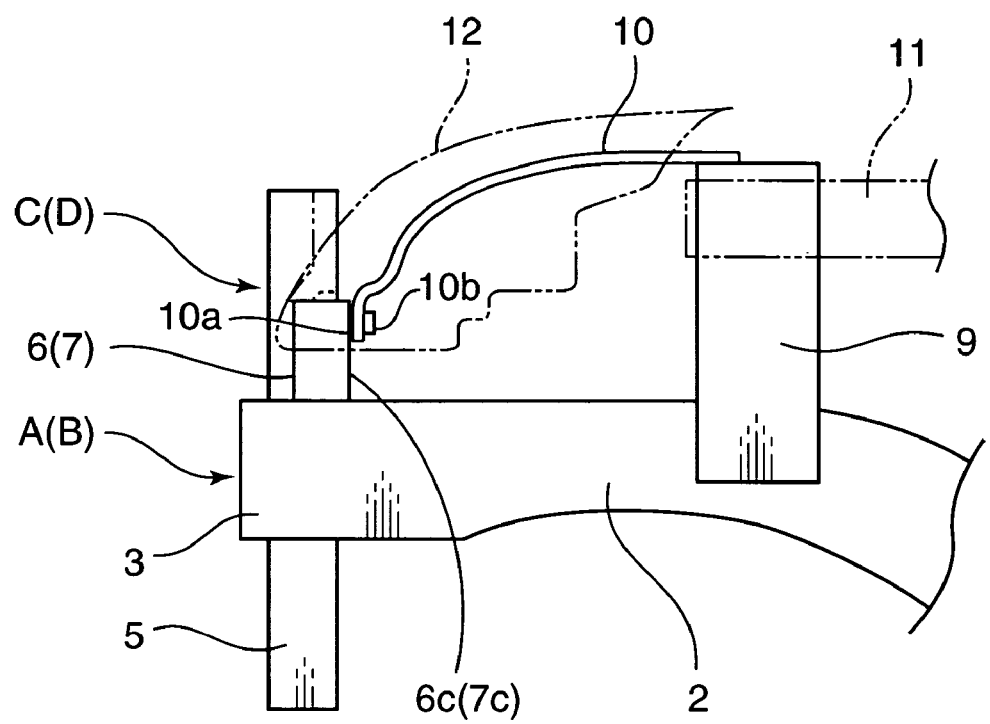
FIG. 3 is a right-side view of the supporting structure.
Figure 4:
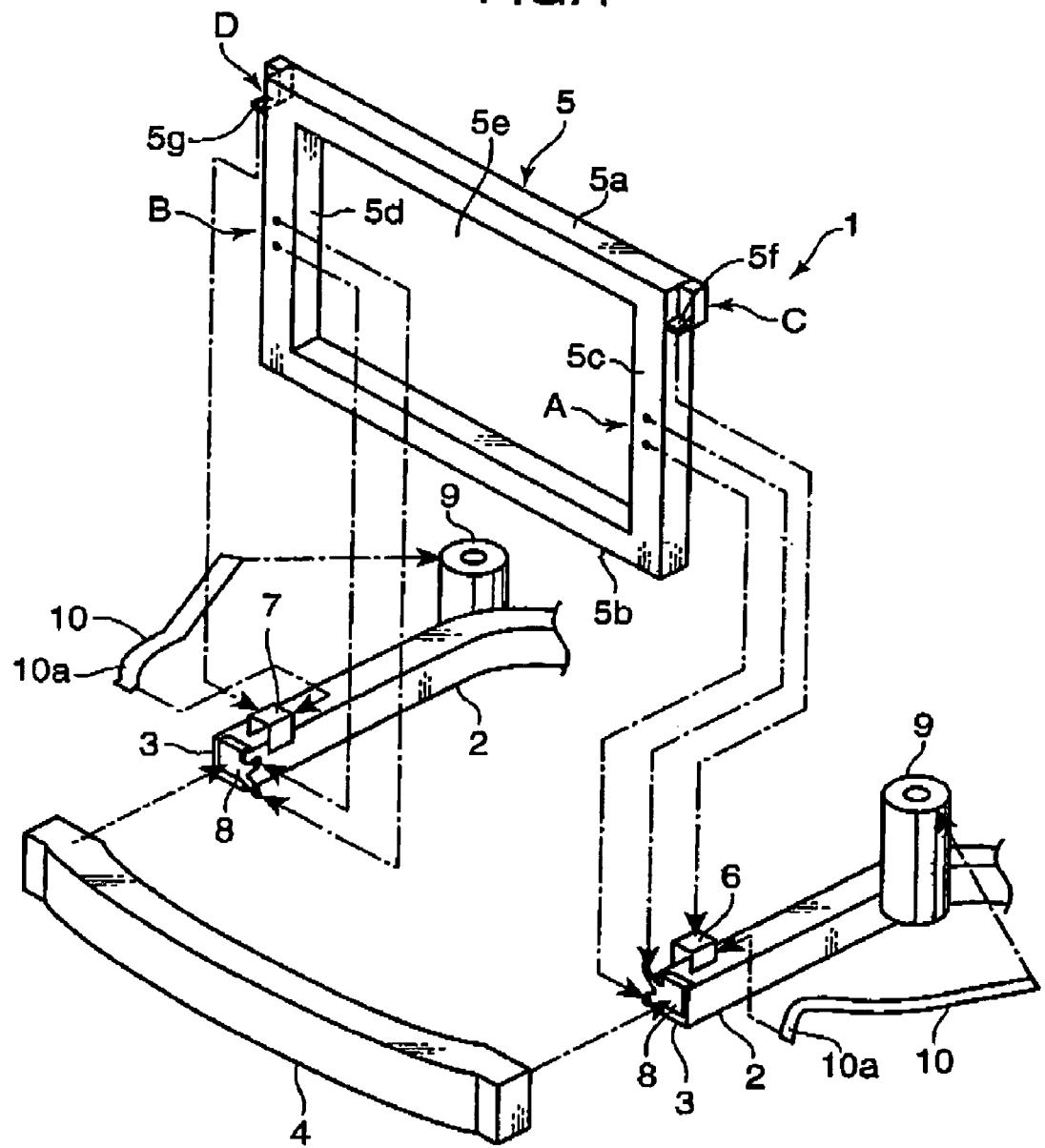
FIG. 4 is a perspective exploded view of the supporting structure.

FIG. 1 is a front view of a shroud supporting structure according to this embodiment. FIG. 2 is a plan view of this supporting structure. FIG. 3 is a right-side view of the supporting structure. FIG. 4 is a perspective exploded view of the supporting structure.

A shroud supporting structure 1 is a structure inside of a hood in the front part of an automobile. It includes: a pair of front side-frames 2 which extends in the front and rear directions of the automobile, on both right and left sides in the front part of the automobile body; a bumper reinforcement 4 as a connection member which bridges front-end parts 3 of both front side-frames 2, so that both front-end parts 3 are linked; and a shroud 5 which is disposed between both front side-frames 2 behind the bumper reinforcement 4. This shroud 5 is joined to the front side-frames 2. Herein, in the vehicle-body front structure which includes this supporting structure 1, a pair of apron reinforcements 11 is disposed in parallel, above the front side-frames 2, in other words, in a position higher than the front side-frames 2. The front end of each apron reinforcement 11 is located behind the shroud 5. Herein, this apron reinforcement 11 is used to reinforce the outer panel of a front fender, and the above described bumper reinforcement 4 is for reinforcing a bumper (not shown) which is attached in front of it.

The above described shroud 5 includes: an upper portion 5a which is its upper side; a lower portion 5b which is the lower side; a side portion 5c which is the left side (on the right-hand side in FIG. 1, FIG. 2 and FIG. 4); and a side portion 5d which is the right side (on the left-hand side in FIG. 1, FIG. 2 and FIG. 4). It is shaped like a rectangle by connecting both ends of the upper portion 5a and both ends of the lower portion 5b to the side portion 5c and the side portion 5d. In this embodiment, it is molded out of synthetic resin so that those portions are united. This shroud 5 is placed so that its opening 5e is oriented in the front and rear directions of the vehicle body. To the rear part of the shroud 5, there is attached a radiator (not shown) or the like.

In the upper-end parts of the left-side side portion 5c and the right-side side portion 5d, protrusion portions 5f, 5g which protrude outward (i.e., sideward) in the vehicle-width directions, are formed so as to be united with them, respectively. In the same way as in this embodiment, the protrusion portions 5f, 5g may also be molded so that they are united with the shroud 5. In addition, they may also be formed as members which are separate from the upper portion 5a and the lower portion 5b, and the side portion 5c and the side portion 5d.

In both right and left front side-frames 2, brackets 6, 7 for attaching the protrusion portions 5f, 5g are disposed on the upper surface of the front-end parts 3, respectively. Note that said brackets 6, 7 each is rigidly connected onto the upper surface of the front-end part 3 of the front side-frame 2 via welding, for instance, but not limited thereto, any other reliable connecting method can be applied. The bracket 7 and the bracket 6 are symmetrical in the right and left directions with respect to the middle line. In this embodiment, the brackets 6, 7 are attached to the parts slightly behind the front-end edge of the front side-frames 2. Herein, these brackets 6, 7 may also be molded so as to be united with the front side-frames 2. However, in the same way as in this embodiment, they can also be formed separately from the front side-frames 2. In that case, if you adopt a structure in which they are each attached to a suitable place of the front side-frames 2, you can obtain an advantage in that such a configuration is easily applied, without changing the design of the front side-frames 2.

Figure 5:
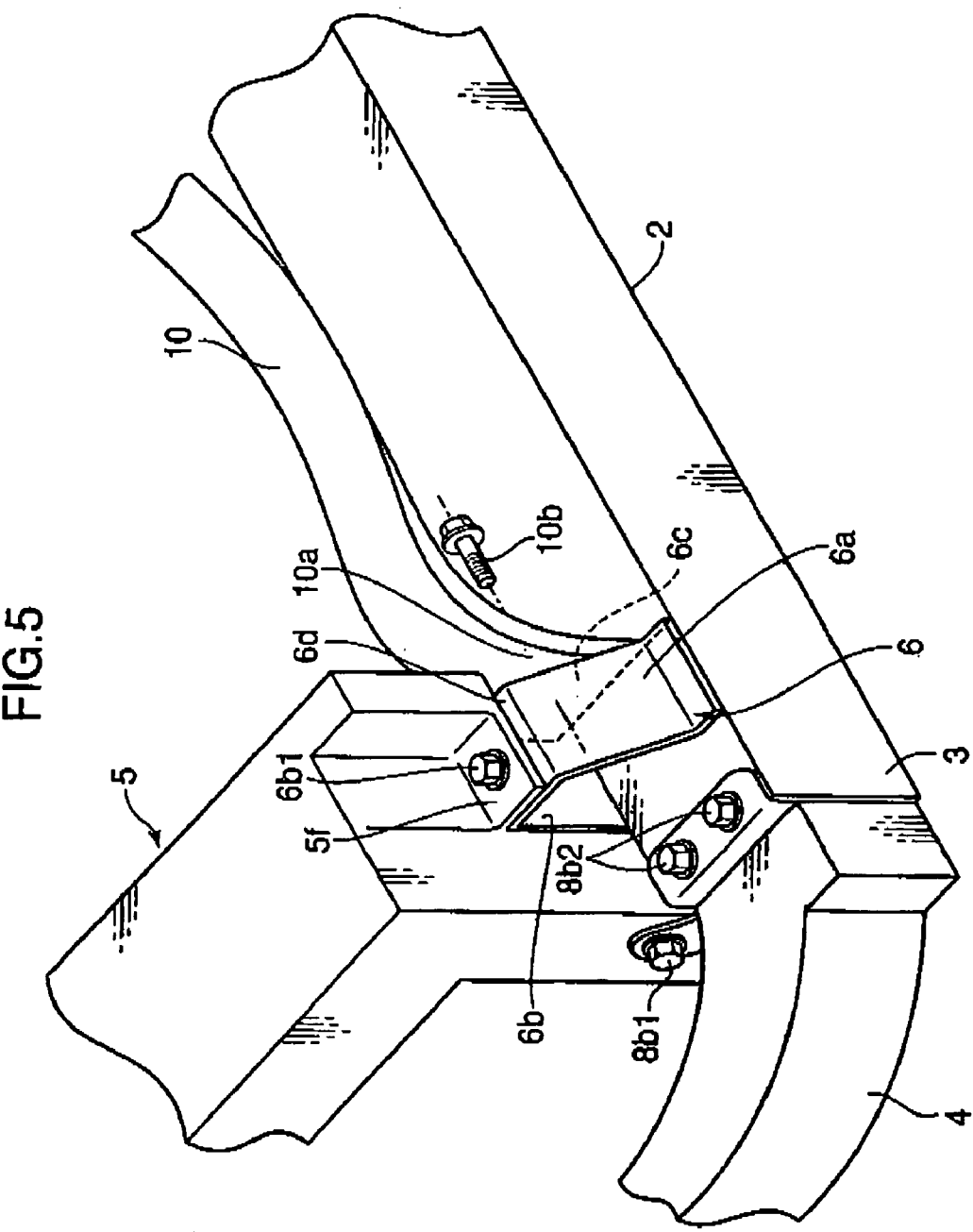
FIG. 5 is a perspective view of a left bracket and its vicinity.
Figure 6:
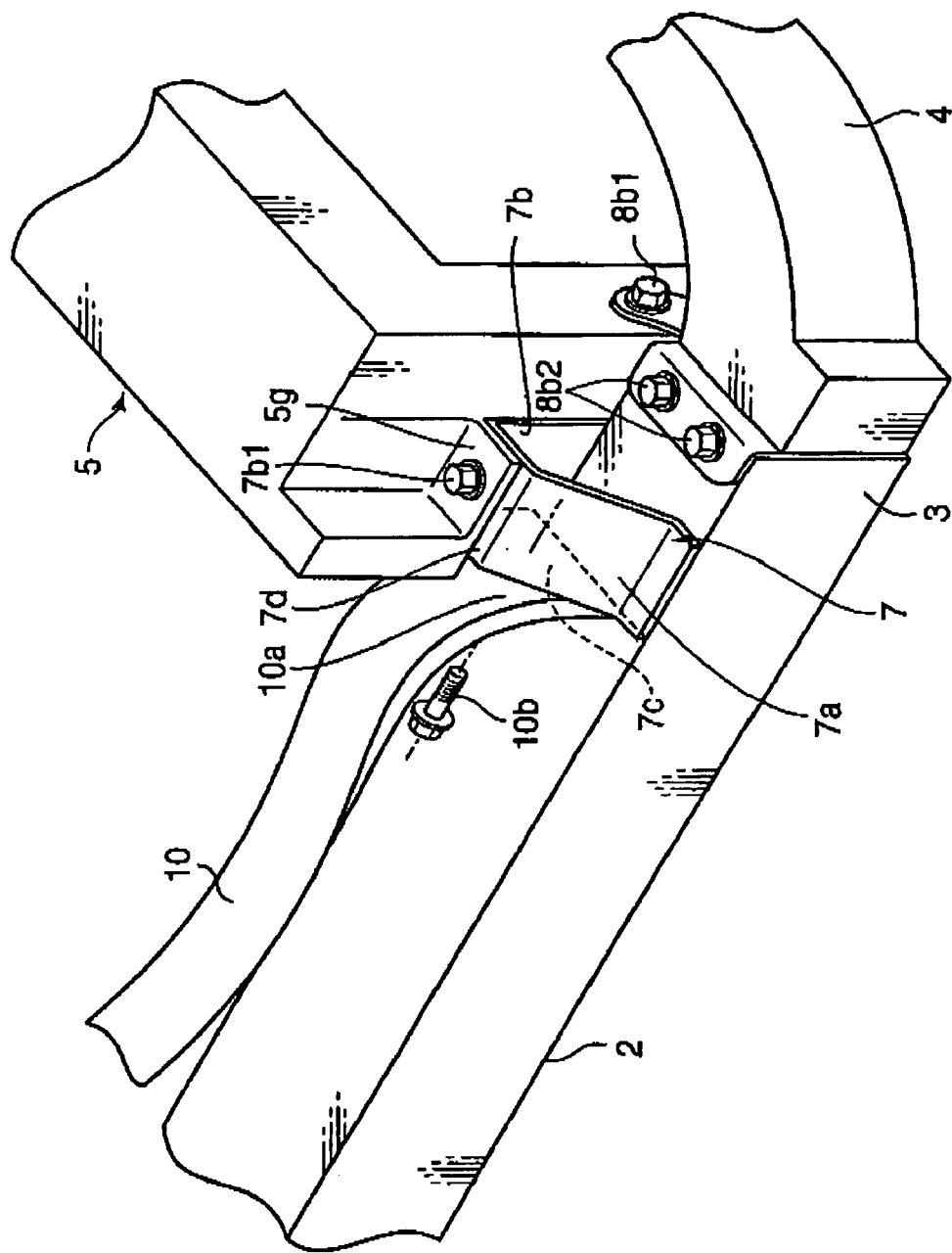
FIG. 6 is a perspective view of a right bracket and its vicinity.

As shown in FIG. 5 and FIG. 6, the brackets 6, 7 are each formed by bending and joining a steel plate which has a predetermined shape at predetermined places. Each of them is shaped like a shelf, and is opened in front of and behind themselves. Specifically, the brackets 6, 7 are formed as shelf-shaped brackets which include: horizontal surface portions 6d, 7d which are placed substantially parallel to the upper surfaces of the front side-frames 2 in a state where the brackets 6, 7 are attached; external side-surface portions 6a, 7a which extend substantially downward from the side edges of these horizontal surface portions 6d, 7d on the outside in the vehicle-width directions; internal side-surface portions 6b, 7b which extend substantially downward from the side edges of the horizontal surface portions 6d, 7d on the inside in the vehicle-width directions; and rear side-surface portions 6c, 7c which extend substantially downward from the rear-end edges of the horizontal surface portions 6d, 7d, respectively. Each side-surface portion 6a to 6c and 7a to 7c functions as a support leg. On the other hand, the horizontal surface portions 6d, 7d each function as a temporary support portion which temporarily supports each protrusion portion 5f, 5g, and in addition, as an attachment portion to which each protrusion portion 5f, 5g is attached.

These horizontal surface portions 6d, 7d are set to be apart from each other, by substantially the same distance by which the protrusion portions 5f, 5g are separate. This allows both horizontal surface portions 6d, 7d to function as the above described temporary support portions and attachment portion.

The above described shroud 5 is joined to the front side-frame 2, at least two places, or first and second joint portions (which correspond to the end-part joint portion and the upper-surface connecting portion, respectively). Specifically, in the shroud 5, first portions A, B having a first height of both side portions 5c, 5d which correspond to the front-end parts 3 are each attached via a fixture 8 to the front-end parts 3 of the pair of front side-frames 2, by means of a bolt 8b1, 8b2 or the like (at the first joint portion), respectively. Note that hereinafter said first portions A, B having first height is referred simply as a first height positions A, B in this specification. In addition, second portions C, D having second height which are higher than the first height portions A, B of both side portions 5c, 5d, or the protrusion portions 5f, 5g, are each attached to the brackets 6, 7 of the front side-frames 2, by means of a bolt 6b1, 7b1 or the like (at the second joint portion), respectively. Note that hereinafter said second portions C, D having second height is referred simply as a second height positions C, D in this specification. Herein, the shroud 5 is placed between the pair of front side-frames 2, so that the movement of the shroud 5 in the vehicle-width directions can be kept under control. Hence, in the case where external force is applied in the vehicle-width directions, a load of the external force which is borne on each joint portion becomes lighter.

In the fixture 8, as shown in FIG. 1, its internal end part in the vehicle-width directions branches off into a Y-shape in the height directions. At each tip part, it is joined to the side-part front surface of a radiator shroud 3. In brief, the fixture 8 branches into a Y-shape in the height directions and holds the radiator shroud 3 at its tip parts. Thereby, the shroud 3 can be effectively prevented from falling.

Figure 10:
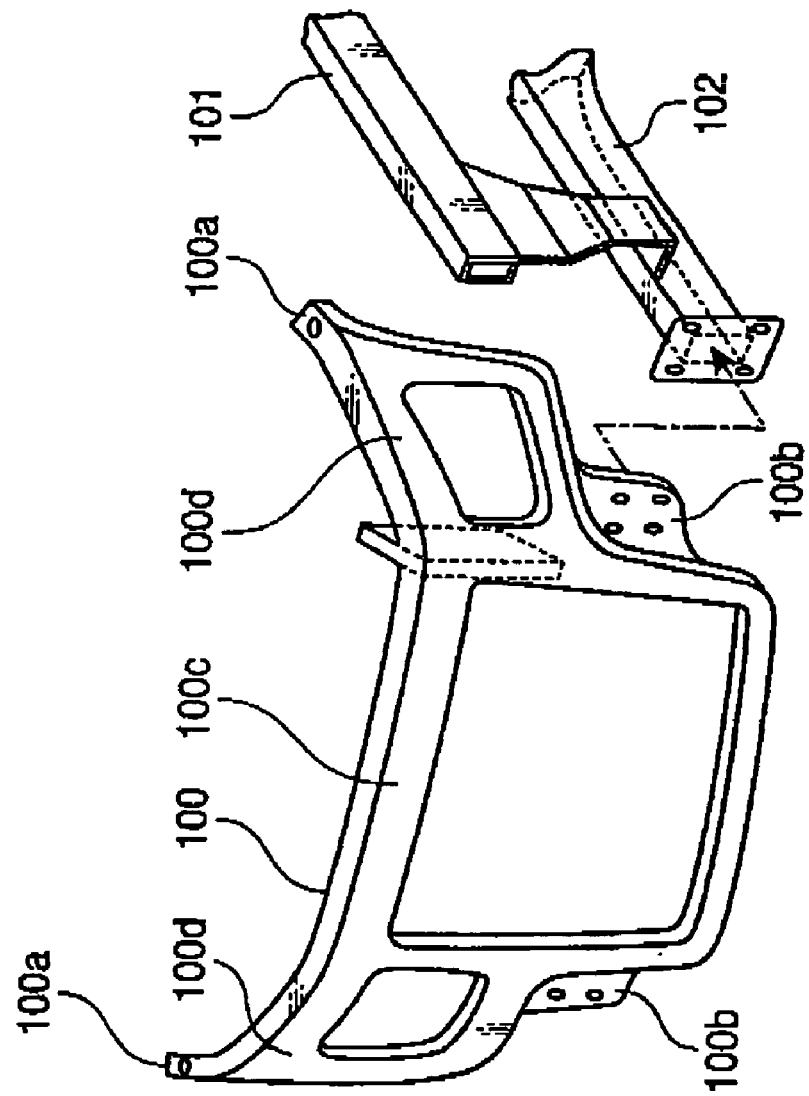
FIG. 10 is a perspective exploded view of a shroud mounting structure according to Patent Document 1.

A suspension support member 9 is provided behind the shroud 5 and on the outside of each front side-frame 2 in the vehicle-width directions. This suspension support member 9 has a cylindrical shape, and its upper side is closed. To its inner part, the upper-end part of a suspension (not shown) whose shaft center is placed substantially in the vertical directions is attached, so that it can support the suspension. To the upper surface of this suspension support member 9, the rear end of a lamp bracket 10 which extends substantially in the front and rear directions of the vehicle body (in the strict sense, in oblique directions where the front end 10a is located inward from the rear end) is connected, by means of a bolt or the like. On the other hand, the front end 10a of this lamp bracket 10 is connected to each of the rear side-surface portions 6c, 7c of the brackets 6, 7, by means of a bolt 10b or the like (see FIG. 3). To this lamp bracket 10, a headlamp 12 is attached which is long in the front and rear directions. The rear end of the headlamp 12 is located behind the shroud 5. The pair of headlamps 12 is provided on both sides of the shroud 5 and above the front side-frames 2. The above described apron reinforcement 11 is placed so that its front end extends up to the position of the rear end of the headlamp 12. Herein, in FIG. 10, the lamp bracket 10 is omitted.

The assembly of a vehicle-body front structure, including the mounting of the shroud 5, is implemented as shown below. First, the fixture 8 is attached to each of the rear surfaces of the bumper reinforcement 4 on both sides in the vehicle-width directions. In this state, each rear surface on both sides of the bumper reinforcement 4 is screwed, together with the fixture 8, to the front-end surface of each front side-frame 2, by means of a bolt or the like. After this bumper reinforcement 4 has been attached like a bridge, the shroud 5 is brought down to between the front side-frames 2. Then, each protrusion portion 5f, 5g is placed on the horizontal surface portion 6d, 7d of each bracket 6, 7. In this state, the fixture 8 and each first height portion A, B of the shroud 5 are joined together. Thereby, the shroud 5 is attached via the fixtures 8 to the front-end parts of the front side-frames 2. As described above, the shroud 5 is attached after the bumper reinforcement 4 has been attached. This is because if the shroud 5 is attached ahead of the bumper reinforcement 4, the front-end parts 3 of both front side-frames 2 may not be placed at a fixed interval. In other words, they may come closer to, or go farther away from, each other. Such a trouble can be evaded, if the bumper reinforcement 4 is first attached to the front side-frames 2.

Specifically, when the shroud 5 is attached, the front-end parts 3 of both front side-frames 2 are linked via the bumper reinforcement 4. This makes it difficult to attach the shroud 5 from forward, and thus, it is moved down from above so as to be placed between the front side-frames 2. At this time, as described above, the horizontal surface portions 6d, 7d are set to be apart from each other, by substantially the same distance by which the protrusion portions 5f, 5g are separate. Thereby, the protrusion portions 5f, 5g are temporarily supported to the horizontal surface portions 6d, 7d, respectively. Besides, the protrusion portions 5f, 5g (in the second height portions C, D) are located at the upper-end parts of the side portions 5c, 5d, respectively. This helps keep the center of gravity at a lower position when and after they are temporarily supported. Hence, when they are kept temporarily supported, the shroud 5 can be prevented from falling in the front and rear directions, without applying any force to hinder the shroud 5 from falling down.

After they are temporarily supported in this way, the shroud 5 is attached so as to be placed between the front-end parts 3 and the bumper reinforcement 4. Specifically, via the fixtures 8 which are attached in advance to the front-end parts 3 of the front side-frames 2, the first height portions A, B in both side portions 5c, 5d of the shroud 5 are attached to the front-end parts 3. Then, the second height portions C, D are attached to the horizontal surface portion 6d of the bracket 6.and the horizontal surface portion 7d of the bracket 7, respectively.

Therefore, in the configuration according to this embodiment, in the shroud 5, the first height portions A, B of both side portions 5c, 5d are supported to the front side-frames 2, and the second height portions C, D of both side portions 5c, 5d are supported to the brackets 6, 7 which are provided in the front side-frames 2, respectively. In other words, the shroud 5 is not designed to be supported to the apron reinforcements 11. Therefore, a vehicle body could be properly dealt with, even if it has a configuration where the rear end of the headlamp 12 is disposed behind the shroud 5, in other words, where the front end of the apron reinforcement 11 is located behind the shroud 5. In addition, in each of both sides of the shroud 5, the two places (i.e., the first height portions A, B and the second height portions C, D) which are different in the height directions are supported to the front side-frame 2. In other words, the place where the shroud 5 is supported to the front side-frame 2 becomes longer in the up-and-down directions. This prevents the shroud 5 from falling down in the front and rear directions. Besides, the number of the places increases at which the front side-frame 2 which is one of the most rigid vehicle-body members is connected to the shroud 5. This helps heighten the rigidity by which the shroud 5 is supported.

In addition, according to this embodiment, when the shroud 5 is mounted on the front side-frames 2, the protrusion portions 5f, 5g of the shroud 5 can be temporarily supported on the horizontal surface portions 6d, 7d (i.e., the temporary support portions 6d, 7d) of the brackets 6, 7, respectively. Therefore, the shroud 5 can be more easily attached, thus enhancing productivity. Furthermore, the temporary support portions 6d, 7d are horizontally formed, and thus, the shroud 5 can be temporarily supported steadily and easily. This makes it possible to adopt the following production process. First, the bumper reinforcement 4 bridges both front side-frames 2, so that the front-end parts 3 of the front side-frames-2 can be placed at a fixed interval. In the state where both front side-frames 2 are connected via the bumper reinforcement 4, the shroud 5 is moved down from above. Thereby, the protrusion portions 5f, 5g of the shroud 5 are temporarily supported on the temporary support portions 6d, 7d of the shelf-shaped brackets 6, 7, respectively. In short, taking a production process into account, you can select a simple configuration where the shroud can be temporarily supported to the brackets.

Moreover, in this embodiment, the front end of the lamp bracket 10 whose rear end is connected to the suspension support member 9 is connected to each of the rear side-surface portions 6c, 7c of the brackets 6, 7. Therefore, the lamp bracket 10 becomes shorter than in the case where the front end of the lamp bracket 10 is connected to the front side-frame 2 in a position near its front end if the brackets 6, 7 are not provided. This reduces the weight of the lamp bracket 10. In addition, each bracket 6, 7 is supported to the front side-frame 2 as well as the lamp bracket 10, thereby heightening the rigidity by which the brackets 6, 7 are supported.

Herein, in the configuration according to this embodiment, the rear end of the lamp bracket is connected to the suspension support member. However, the present invention is not limited to this. It may also be connected to a place which has a great strength near the suspension support member, for example, to the apron reinforcement 11 shown by a chain double-dashed line in each of FIG. 1 and FIG. 2, or the like.

Second Embodiment

Hereinafter, a shroud supporting structure according to a second embodiment of the present invention will be described with reference to FIG. 7 to FIG. 9. FIG. 7 is a perspective view of a shroud and a front side-frame, showing a state in which the shroud is attached to the front side-frames. FIG. 8 and FIG. 9 are a front view and a right-side view of the shroud supporting structure according to the second embodiment, corresponding to FIG. 1 and FIG. 3, respectively. Herein, in FIG. 7, the bumper reinforcement and the front side-frame are shown separate from each other, which can be useful in describing them. However, in practice, the shroud is supposed to be attached after the bumper reinforcement has been attached, in the same way as in this embodiment.

With respect to the positional relation between the front side-frame 2 and a shroud 55, this shroud supporting structure according to the second embodiment is the same as the shroud supporting structure according to the first embodiment. However, it is different from that according to the first embodiment in the following point. The brackets 6, 7 of the front side-frame 2 are omitted, and thus, protrusion portions 55f, 55g of the shroud 55 each extend downward and are in contact with the upper surface of the front side-frame 2. This different point is focused and described below. If the configuration in these figures is the same as that according to the first embodiment, the corresponding characters and numerals are given to their identical component parts, and thus, their description is omitted.

As shown in FIG. 7 to FIG. 9, this shroud supporting structure according to the second embodiment includes: front side-frames 2 which each have a closed section; a bumper reinforcement 4 as a connection member which bridges front-end parts 3 of both front side-frames 2, so that both front-end parts 3 are linked; and the shroud 55 which is disposed between both front side-frames 2 behind the bumper reinforcement 4. This shroud 55 is joined to the front-end part and upper surface of each front side-frame 2, at two places (i.e., first and second joint portions) on each right and left side in the vehicle-width directions, or at substantially middle parts in the height directions.

Specifically, the shroud 55 has the same configuration as that according to the first embodiment, except the protrusion portions 5f, 5g which protrude outward in the vehicle-width directions. This shroud 55 is used to support a radiator which is disposed on the side of its rear surface, and it is molded out of synthetic resin. This shroud 55 has a substantially rectangular shape and is opened in the front and rear directions. Specifically, it includes: an upper portion 55a which is located above the upper surface of the front side-frame 2 and extends in the vehicle-width directions; a lower portion 55b which is located below the bumper reinforcement 4 and is parallel to the upper portion 55a; side portions 55c, 55d which connect both ends of these upper portion 55a and lower portion 55b; and the protrusion portions 55f, 55g which each protrude outward in the vehicle-width directions in the upper half part of each side portion 55c, 55d. These upper portion 55a, lower portion 55b and side portions 55c, 55d surround a radiator so as to support the radiator.

The first joint portion (which corresponds to the end-part joint portion) which is joined to the front-end part of the front side-frame 2 is provided on the front surface at a substantially middle part in the height directions in the side portions 55c, 55d of the shroud 55. It is joined to the front-end part of the front side-frame 2, via the fixture 8. In the same way as that according to the first embodiment, the first joint portion is joined by screwing each branching tip part of the fixture 8 which branches into a Y-shape, by means of a bolt 8b or the like, in the vehicle front-and-rear directions. In brief, the fixture 8 branches off in the height directions and is joined at each branching tip part to the first joint portion. Thereby, the shroud 55 can be effectively prevented from falling down. Herein, in this second embodiment, the first joint portion is provided at several different places in the height directions. However, it may also be provided at only one place. In the case where the first joint portion is provided at several places, as long as at least one of them is in a different height position from the second joint portion, the rigidity by which the shroud is supported can be heightened.

On the other hand, the second joint portion (which corresponds to the upper-surface connecting portion) which is connected to the upper surface of the front side-frame 2 is configured as the above described protrusion portions 55f, 55g. These protrusion portions 55f, 55g are each formed by joining a plurality of surfaces at substantially right angles or at predetermined angles. Thereby, they each becomes a shell-shaped rigid part which has a certain strength. As shown in FIG. 7 and FIG. 8, they protrude outward from the side portions 55c, 55d in the vehicle-width directions. In addition, each of them extends from the upper-end edge of each side portion 55c, 55d up to a position slightly above the middle part in the height directions, so that its lower-end surface comes into contact with the upper surface of the front side-frame 2. In this second embodiment, the protrusion portions 55f, 55g are united with the side portion 55c, 55d, respectively.

In further detail, each protrusion portion 55f, 55g includes: a tongue-shaped layered portion 551 which is layered over the upper surface of the front side-frame 2 in a position a little behind its front-end edge; a reinforcement portion 552 which extends upward from the rear-end edge of this layered portion 551, whose side edge is formed continuously with the external edge of each protrusion portion 55f, 55g, and whose external surfaces are united like a shell so that it has a great rigidity; and a triangular reinforcement rib 553 which connects the outside edges of the layered portion 551 and the reinforcement portion 552 in the-vehicle-width directions. The layered portion 551 is placed on the upper surface of the front side-frame 2, and then, it is securely joined to this upper surface, by means of a screw (e.g., in the second embodiment, a bolt 551b and a nut), in the height directions (i.e., in the up-and-down directions).

This second joint portion is joined behind the first joint portion in the vehicle front-and-rear directions. This allows it to function as a part which supports the shroud 55, thus certainly preventing the shroud 55 from falling down.

Herein, in this second embodiment, the front-end part of a lamp bracket 10 is joined to the rear surface of a sub-bracket 56 which is connected to the upper surface of the front side-frame 3, by means of a bolt 10b or the like.

This shroud 55 according to the second embodiment is joined and supported to the front side-frame 2, at the two places of the first and second joint portions. This heightens the rigidity by which the shroud 55 is supported on the vehicle body, thus effectively preventing the shroud 55 from falling down. In addition, the second joint portion is configured as the protrusion portions 55f, 55g. Each protrusion portion 55f, 55g is joined to the upper surface of the front side-frame 2. Thereby, this protruding second joint portion can bear the load of the shroud 55. Besides, this second joint portion is joined to the front side-frame 2, on the outside in the vehicle-width directions from the first joint portion. This further heightens the rigidity by which the shroud 55 is supported on the vehicle body.

Furthermore, the shroud 55 is joined at the two upper and lower places which are different in the height directions in the first joint portion. Besides, it is also joined at the second joint portion provided in a position which is different in the vehicle-width directions from the first joint portion. This makes it possible to support the shroud 55 at the three points which do not lie on one and the same straight line, thereby heightening the rigidity by which the shroud 55 is supported.

Moreover, the layered portion 551 of each protrusion portion 55f, 55g which is the second joint portion is in contact with the upper surface of the front side-frame 2. This effectively prevents the shroud 55 from falling down.

In addition, the first joint portion is joined in the front and rear directions of the vehicle, and the second joint portion is joined in the height directions of the vehicle. Therefore, at the first joint portion and the second joint portion, the shroud 55 can be joined to the front side-frame 2 in the directions substantially perpendicular to each other. This makes it possible to effectively disperse the external force which is applied to the shroud 55, and to transmit it to the front side-frame 2. This further heightens the rigidity by which the shroud 55 is supported.

Furthermore, the first joint portion is joined to the front-end surface of the front side-frame 2, and the second joint portion is joined to the upper surface of the front side-frame 2 in a position behind the first joint portion in the front and rear directions of the vehicle. Therefore, the second joint portion can also bear the moment of rotation around the first joint portion which works on the shroud. This helps firmly prevent the shroud 55 from falling down.

Moreover, the upper part of the second joint portion extends up to the upper-end part of the shroud 55. Therefore, external force in the height directions which is given to any place of the shroud 55 can also be surely transmitted to the second joint portion. Then, it can be transmitted to the upper surface of the front side-frame 2. This certainly allows such external force to disperse, thereby heightening the rigidity by which the shroud 55 is supported.

As described above, in the shroud supporting structure according to the present invention, each side part of the shroud can be supported in positions which are different in the height directions. This helps heighten the rigidity by which the shroud is supported, thus effectively preventing the shroud from falling down. Therefore, the shroud can be properly supported, even if a vehicle body has a configuration where the front end of an apron reinforcement is located behind the shroud.

In the shroud mounting method according to the present invention, the shroud is supported to the front side-frame, at the two places which are different in the height directions. This prevents the shroud from falling down in the front and rear directions. Even in the case where the rear end of a headlamp is disposed behind a shroud, the shroud can be properly supported and mounted. Besides, taking a production process into account, you can select a simple configuration where a shroud can be temporarily supported to the brackets.

In summary, a shroud supporting structure according to the present invention comprising:

a shroud which has a substantially rectangular shape and whose opening is oriented in the front and rear directions of an automobile;

a pair of front side-frames which is disposed on both right and left sides;

a pair of headlamps which is disposed in both side parts of the shroud and above the front side-frames;

a pair of right and left apron reinforcements which is disposed above the front side-frames and whose front ends each extends up to the rear end of the headlamp, and in which a first portion having a first height in both side parts of the shroud which corresponds to the front-end part of each of the pair of front side-frames is attached to this front end, and a second portion having a second height which corresponds substantially to the headlamp above each first portion in both side parts is attached to the body of the automobile, wherein:

the rear end of the headlamp is located behind the shroud;

a protrusion portion which protrudes sideward is formed in each of the second portion in both side parts of the shroud; and a bracket which protrudes upward up to the second portion is formed on the front-end part of the front side-frame and the protrusion portion is attached to said bracket.

According to the present invention, the shroud is supported, not only at the first portions of both side parts by the front side-frames, but also at the second portions of both side parts by the brackets which are formed in the front side-frames. Therefore, each side part of the shroud can be supported in positions which are different in the height directions. In other words, the place where the shroud is supported to the front side-frame becomes longer in the up-and-down directions. This helps heighten the rigidity by which the shroud is supported, thus effectively preventing the shroud from falling. Hence, the shroud can be effectively prevented from falling, even though it is supported only by the front side-frames. Thus, there is no need to support the shroud by any apron reinforcements. Therefore, a vehicle body could be properly dealt with, even if it has a configuration where the rear end of a headlamp is disposed behind a shroud, in other words, where the front end of an apron reinforcement is located behind the shroud. In addition, the number of the places increases at which a front side-frame which is one of the most rigid vehicle-body members is connected to a shroud. This helps heighten the rigidity by which the shroud is supported.

In the shroud supporting-structure according to the present invention, it is preferable that, in the bracket of the front side-frame, a temporary support portion be formed which temporarily supports the protrusion portion of the shroud.

According to this configuration, when the shroud is mounted on the front side-frame, the protrusion portion of the shroud can be temporarily supported on the temporary support portion of the bracket. Therefore, the shroud can be more easily attached, thus enhancing productivity.

In this case, preferably, the bracket should be a shelf-shaped bracket which is disposed on the front side-frame; and the temporary support portion thereof should be a horizontal surface portion which is the upper surface of the shelf-shaped bracket. Herein, needless to say, the horizontal surface portion of the bracket is a horizontal surface in the case where a vehicle lies in the horizontal posture.

According to this configuration, the temporary support portion is the horizontal surface portion, and thus, the protrusion portion can be placed on this horizontal surface portion. Therefore, the shroud can be temporarily supported steadily and easily. This makes it possible to adopt the following production process. First, a connection member such as a bumper reinforcement spans both front side-frames, so that the front-end parts of the front side-frames can be placed at a fixed interval. In the state where both front side-frames are connected via the connection member, the shroud is moved down from above. Thereby, the protrusion portion of the shroud is temporarily supported on the temporary support portion of the shelf-shaped bracket. In short, taking a production process into account, you can select a simple configuration where the shroud can be temporarily supported to the bracket.

In the shroud supporting structure according to the present invention, it is preferable that, to the bracket, a lamp bracket be connected at the front end thereof which extends substantially in the front and rear directions of the automobile body so as to support the headlamp; and the rear end of the lamp bracket be connected to a suspension support portion, or the vicinity thereof.

According to this configuration, the lamp bracket becomes shorter than any lamp bracket which is connected at its front end to the front side-frame. This reduces the weight of the lamp bracket itself. In addition, the bracket is joined to the front side-frame as well as the lamp bracket, thereby heightening the rigidity by which the bracket is supported. Especially, the rigidity by which the bracket is supported becomes greater in the front and rear directions of a vehicle.

Furthermore, the shroud supporting structure according to another aspect of the present invention, which includes: a pair of right and left front side-frames which extends in the front and rear directions of a vehicle; and a shroud which has a frame shape, and bridges the front-end parts of the pair of front side-frames so that the opening thereof is located in the front and rear directions of the vehicle, wherein the shroud protrudes outward in the width directions of the vehicle, and includes an upper-surface connecting portion which is connected to the upper surface of each front side-frame and an end-part joint portion which is joined to a predetermined place of the front-end part of the front side-frame in a position different from this upper-surface connecting portion in the height directions.

According to this aspect of the present invention, the shroud is joined and supported to the front side-frame, at least at the end-part joint portion and the upper-surface connecting portion. Thereby, the shroud is supported in positions different in the height directions. This heightens the rigidity by which the shroud is supported on the vehicle body, thus effectively preventing the shroud from falling. In addition, the upper-surface connecting portion protrudes outward in the width directions of the vehicle, and this protrusion portion is joined to the upper surface of the front side-frame. Thereby, this protruding upper-surface connecting portion can exclusively bear the load of the shroud. Besides, this upper-surface connecting portion is joined to the front side-frame, on the outside in the vehicle-width directions from the end-part joint portion. This further heightens the rigidity by which the shroud is supported on the vehicle body.

In this case, it is preferable that the end-part joint portion be disposed in the front surface of the shroud, and be joined to the front side-frame via an attachment member which is joined to the end-part joint portion in the front and rear directions; and the upper-surface connecting portion have a layered surface which is layered over the upper surface of the front side-frame, and be joined via this layered surface to the upper surface of the front side-frame in the height directions of the vehicle.

According to this configuration, the end-part joint portion is joined in the front and rear directions of the vehicle, and the upper-surface connecting portion is joined in the height directions of the vehicle. Therefore, at the end-part joint portion and the upper-surface connecting portion, the shroud can be joined to the front side-frame in the directions substantially perpendicular to each other. This makes it possible to effectively disperse the external force which is applied to the shroud, and to transmit it to the front side-frame. This further heightens the rigidity by which the shroud is supported.

In the shroud supporting structure according to this aspect of the present invention, preferably, the upper-surface connecting portion should be joined to the upper surface of the front side-frame in a position behind the end-part joint portion in the front and rear directions of the vehicle.

According to this configuration, the upper-surface connecting portion is joined to the upper surface of the front side-frame in a position behind the end-part joint portion in the front and rear directions of the vehicle. Therefore, the upper-surface connecting portion can also bear the moment of rotation around the end-part joint portion which works on the shroud. This helps firmly prevent the shroud from falling.

In the shroud supporting structure according to this aspect of the present invention, it is preferable that the upper part of the upper-surface connecting portion extend up to the upper-end part of the shroud.

According to this configuration, the upper part of the upper-surface connecting portion extends up to the upper-end part of the shroud. Therefore, external force in the height directions which is given to any place of the shroud can also be surely transmitted to the upper-surface connecting portion. Then, it can be transmitted to the upper surface of the front side-frame. This certainly allows such external force to disperse, thereby heightening the rigidity by which the shroud is supported.

On the other hand, the shroud mounting method according to the present invention, comprising the processes of: placing a shelf-shaped bracket which has a horizontal surface portion at the upper part thereof, on each of the front-end parts of both front side-frames which are disposed on both right and left sides, and connecting a connection member which bridges the front-end parts of both front side-frames, to both front-end parts; moving down a shroud which has protrusion portions that protrude sideward on both sides at the upper part thereof, from above the front side-frames, and temporarily supporting the protrusion portion on the horizontal surface portion; and connecting the front-end part of the front side-frame and a first height portion in the side part of the temporarily-supported shroud which corresponds to the front-end part, and connecting the protrusion portion which is a second height portion above the first-height portion and the horizontal surface portion.

In this shroud mounting method according to the present invention, the first height portion of each of both side parts of the shroud is supported to the front side-frame, and the second height portion of each of both side parts of the shroud is supported to the shelf-shaped bracket which is provided in the front side-frame. Thus, there is no need to support the shroud by any apron reinforcements. Therefore, a vehicle body could be properly dealt with, even if it has a configuration where the rear end of a headlamp is disposed behind a shroud, in other words, where the front end of an apron reinforcement is located behind the shroud. In addition, in each of both sides of the shroud, the two places which are different in the height directions are supported to the front side-frame. In other words, the place where the shroud is supported to the front side-frame becomes longer in the up-and-down directions. This prevents the shroud from falling in the front and rear directions. Besides, the number of the places increases at which the front side-frame which is one of the most rigid vehicle-body members is connected to the shroud. This helps heighten the rigidity by which the shroud is supported. Moreover, taking a production process into account, you can select a simple configuration where the shroud can be temporarily supported to the bracket.

Preferably, this shroud mounting method should further comprise the process of, after the shroud is connected to the front side-frame and the shelf-shaped bracket, connecting one end of a lamp bracket which extends substantially in the front and rear directions of a vehicle body so as to support a headlamp, to a suspension support portion or the vicinity thereof, and connecting the other end of the lamp bracket to the rear surface of the shelf-shaped bracket. Herein, the vicinity of the suspension support portion is a place which is located near the suspension support portion, and thus, that has a great strength. For example, it corresponds to an apron reinforcement or the like.

This configuration prevents the shroud from being difficult to mount. It also helps reduce the weight of the lamp bracket and heighten the rigidity by which the bracket is supported.

This application is based on Japanese patent application serial Nos. 2003-424857 and 2004-285780, filed in Japan Patent Office on Dec. 22, 2003 and Sep. 30, 2004, respectively, accordingly the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A shroud supporting structure comprising:
   a shroud having an opening oriented in the front and rear directions of an automobile, said shroud including side parts extending substantially in a vertical direction,
   a pair of front side-frames disposed on both right and left sides adjacent said shroud, front ends of said front side frames being connected to first areas of said side parts;
   a pair of headlamps disposed adjacent both side parts of the shroud and above the front side-frames;
   a pair of right and left apron reinforcements disposed above the front side-frames, front ends of said apron reinforcements each extend up to a rear end of the headlamp,
   a protrusion portion which protrudes sideward formed on second areas of both side parts of the shroud;
   a bracket rigidly provided on the top surface of the front-end part of the front side frame,
   a horizontal surface formed on the top surface of the bracket; and
   a lower surface of the protrusion portion formed on each side of the shroud is connected to the horizontal surface of the bracket,
   wherein the shroud is mounted on the shroud support structure such that the rear end of the headlamp is located behind the shroud.

2. The shroud supporting structure according to claim 1, further comprising a temporary support portion formed in said bracket which temporarily supports the protrusion portion of the shroud.

3. The shroud supporting structure according to claim 1, further comprising
   a lamp bracket connected to the bracket at the front end thereof which extends substantially in the front and rear directions of the automobile body so as to support the headlamp; and
   the rear end of the lamp bracket is connected to a suspension support portion, or the vicinity thereof.

4. The shroud supporting structure according to claim 2, further comprising
   a lamp bracket connected to the bracket at the front end thereof which extends substantially in the front and rear directions of the automobile body so as to support the headlamp; and
   the rear end of the lamp bracket is connected to a suspension support portion, or the vicinity thereof.

5. A shroud supporting structure comprising:
   a pair of right and left front side-frames which extend in the front and rear directions of a vehicle; and
   a shroud which bridges front-end parts of the pair of front side-frames so that an opening of said shroud is located in the front and rear directions of the vehicle,
   wherein the shroud protrudes outward in the width direction of the vehicle, and said shroud includes;
   an upper-surface connecting portion connected to an upper surface of each front side-frame, and
   an end-part joint portion which is joined to a predetermined place of the front-end part of the front side-frame in a position different from the upper-surface connecting portion in a height direction.

6. The shroud supporting structure according to claim 5, wherein:
   the end-part joint portion is disposed in the front surface of the shroud, and is joined to the front side-frame via an attachment member which is joined to the end-part joint portion in the front and rear directions; and
   the upper-surface connecting portion has a layered surface which is layered over the upper surface of the front side-frame, and is connected via this layered surface to the upper surface of the front side-frame in the height direction of the vehicle.

7. The shroud supporting structure according to claim 5, wherein the upper-surface connecting portion is connected to the upper surface of the front side-frame in a position behind the end-part joint portion in the front and rear directions of the vehicle.

8. The shroud supporting structure according to claim 6, wherein the upper-surface connecting portion is connected to the upper surface of the front side-frame in a position behind the end-part joint portion in the front and rear directions of the vehicle.

9. The shroud supporting structure according to claim 5, wherein the top end of the upper-surface connecting portion extends up to the upper-end part of the shroud.

10. A shroud mounting method, comprising the steps of:
    providing a shroud and front side-frames, said front side-frames being spaced apart in a widthwise direction of a vehicle,
    placing a shelf-shaped bracket which has a horizontal surface portion at an upper part thereof, on front-end parts of each of the front side-frames, and connecting a connection member which bridges the front-end parts of both front side-frames, to both front-end parts;

position the shroud having protrusion portions that protrude sideward from both sides of the shroud at an upper part thereof, from above the front side-frames, and temporarily supporting the protrusion portion on the horizontal surface portion; and connecting the front-end part of the front side-frame and the side part of the temporarily-supported shroud together at a first height position which substantially corresponds to the front-end part, and connecting the protrusion portion and the horizontal surface portion together at a second height position which is higher than said first height position.

11. The shroud mounting method according to claim 10, further comprising the step of, after the shroud is connected to the front side-frame and the shelf-shaped bracket, connecting one end of a lamp bracket to a suspension support portion or the vicinity thereof, and connecting the other end of the lamp bracket to the rear surface of the shelf-shaped bracket.

12. A shroud supporting structure comprising:

a shroud having an opening oriented in the front and rear directions of an automobile, said shroud including side parts extending substantially in a vertical direction;

a pair of front side-frames disposed on both right and left sides adjacent the shroud, front ends of said side frames being connected to first areas of said side parts, respectively;

a pair of headlamps disposed adjacent said side parts of the shroud and above the front side-frames;

a pair of right and left apron reinforcements disposed above the front side-frames, front ends of said apron reinforcement each extend up to a rear end of the headlamp, a protrusion portion which protrudes sideward is formed on second areas of both side parts of the shroud; and a mounting portion is formed on at least an upper surface of the front-end part of the front side-frame and a respective protrusion portion of said side part of said shroud is attached to said mounting portion of each of said front side-frames wherein the shroud is mounted in the mounting portion such that the rear end of the headlamp is located behind the shroud.

13. The shroud supporting structure according to claim 12, wherein said mounting portion includes a bracket which is rigidly provided on the front-end part of the front side frame.

14. The shroud supporting structure according to claim 12, wherein said protrusion portion extends all the way down to said mounting portion of the front side frame.

* * * * *